(12) United States Patent
Sakai et al.

(10) Patent No.: US 11,489,195 B2
(45) Date of Patent: Nov. 1, 2022

(54) SOLID ELECTROLYTE MATERIAL AND BATTERY USING SAME

(71) Applicant: Panasonic Intellectual Property Management Co., Ltd., Osaka (JP)

(72) Inventors: Akihiro Sakai, Nara (JP); Seiji Nishiyama, Osaka (JP); Kenta Nagamine, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 382 days.

(21) Appl. No.: 16/698,971

(22) Filed: Nov. 28, 2019

(65) Prior Publication Data

US 2020/0212478 A1    Jul. 2, 2020

(30) Foreign Application Priority Data

Dec. 28, 2018    (JP) .............................. JP2018-248596

(51) Int. Cl.
*H01M 10/0562*    (2010.01)
*H01M 10/0525*    (2010.01)

(52) U.S. Cl.
CPC ... *H01M 10/0562* (2013.01); *H01M 10/0525* (2013.01); *H01M 2300/008* (2013.01)

(58) Field of Classification Search
None
See application file for complete search history.

(56) References Cited

U.S. PATENT DOCUMENTS 10,008,735 B2    6/2018  Ohtomo et al.
2013/0266878 A1*  10/2013  Vajo ........................ C01B 3/001
                                                  429/421

(Continued)

FOREIGN PATENT DOCUMENTS

CN        105254184 A  *  1/2016
JP        2006-244734      9/2006

(Continued)

OTHER PUBLICATIONS

Asano et al.; "Solid Halide Electrolytes with High Lithium-Ion Conductivity for Application in 4 V Class Bulk-Type All-Solid-State Batteries"; Advanced Materials, vol. 30, Issue 44 (first published on Sep. 14, 2018), pp. 1-7. (Year: 2018).*

(Continued)

*Primary Examiner* — Gregg Cantelmo
(74) *Attorney, Agent, or Firm* — McDermott Will & Emery LLP (57) ABSTRACT

A solid electrolyte material is composed of Li, M, and X, where M is at least one kind of element selected from the group consisting of metalloid elements and metallic elements other than Li, and X is at least one kind of element selected from the group consisting of F, Cl, Br and I. In the solid electrolyte material, the mathematical formula $FWHM/2\theta_p \leq 0.015$ is satisfied, where FWHM represents a half bandwidth of an X-ray diffraction peak having the highest intensity within a range of a diffraction angle $2\theta$ of not less than 25 degrees and not more than 35 degrees in an X-ray diffraction pattern provided by an X-ray diffraction measurement of the solid electrolyte material; the X-ray diffraction measurement using a Cu-Kα ray; and $2\theta_p$ represents a diffraction angle of a center of the X-ray diffraction peak.

9 Claims, 5 Drawing Sheets

(56) References Cited

U.S. PATENT DOCUMENTS

2018/0183064 A1* 6/2018 Takahashi .............. C08L 47/00
2019/0088995 A1 3/2019 Asano et al.

FOREIGN PATENT DOCUMENTS

| JP | 2011-129312 | 6/2011 |
|---|---|---|
| WO | 2018/025582 | 2/2018 |

OTHER PUBLICATIONS

Alves et al.; "Mixed lithium indium halides as solid-electrolytes: Computational experiments on drivers of Li+ diffusion"; Abstracts of Papers, 253rd ACS National Meeting & Exposition, San Francisco, CA, United States, Apr. 2-6, 2017 Pages: COMP-307 Conference; Meeting Abstract. (Year: 2017).*

Bohnsack et al.; "Ternary halides of the A3MX6 type. Part 6. Ternary chlorides of the rare earth elements with lithium, Li3MCl6 (M = Tb—Lu, Y, Sc). Synthesis, crystal structures, and ionic motion"; vol. 623; Issue: 7; pp. 1067-1073 (Year: 1997).*

Li et al. "Progress and perspectives on halide lithium conductors for all-solid-state lithium batteries"; Energy Environ. Sci., 2020,13, 1429-1461. (Year: 2020).*

Y. Tomita et al., "Substitution effect of ionic conductivity in lithium ion conductor, LI3INBR6-xCLx", Solid State Ionics 179 (2008), 867-870, Apr. 14, 2008.

A. L. Allred, "Electronegativity Values From Thermochemical Data", Journal of Inorganic and Nuclear Chemistry, 1961, vol. 17, pp. 215 to 221.

R. D. Shannon, "Revised Effective Ionic Radii and Systematic Studies of Interatomic Distances in Halides and Chalcogenides", Acta Cryst. (1976), A32, 751, Sep. 1976.

* cited by examiner

SOLID ELECTROLYTE MATERIAL AND BATTERY USING SAME

BACKGROUND

1. Technical Field

The present disclosure relates to a solid electrolyte material and a battery using the same.

2. Description of the Related Art

Patent Literature 1 discloses an all-solid-state battery using a sulfide solid electrolyte material.

Patent Literature 2 and Non-Patent Literature 1 disclose an all-solid-state battery using a halide including indium as a solid electrolyte material.

Patent Literature 3 discloses a solid electrolyte material represented by a composition formula $Li_{6-3z}Y_zX_6$ ($0<z<2$ and X=Cl or Br).

CITATION LIST

Patent Literature

Patent Literature 1: Japanese Patent Application Publication No. 2011-129312
Patent Literature 2: Japanese Patent Application Publication No. 2006-244734
Patent Literature 3: International Publication No. WO 2018/025582

Non-Patent Literature

Non-Patent Literature 1: Y. Tomita et. al., "Substitution effect of ionic conductivity in lithium ion conductor, $LI_3INBR_{6-x}CL_x$", Solid State Ionics 179 (2008) 867-870

SUMMARY

An object of the present disclosure is to provide a solid electrolyte material having high ionic conductivity.

The solid electrolyte material according to the present disclosure is composed of Li, M, and X;
where
M is at least one kind of element selected from the group consisting of metalloid elements and metallic elements other than Li; and
X is at least one kind of element selected from the group consisting of F, Cl, Br and I,
the following mathematical formula (I) is satisfied;

$$FWHM/2\theta_p \leq 0.015 \quad (I)$$

where
FWHM represents a half bandwidth of an X-ray diffraction peak having the highest intensity within a range of a diffraction angle 2θ of not less than 25 degrees and not more than 35 degrees in an X-ray diffraction pattern provided by an X-ray diffraction measurement of the solid electrolyte material; the X-ray diffraction measurement using a Cu-Kα ray; and
$2\theta_p$ represents a diffraction angle of a center of the X-ray diffraction peak;
a value $r_{CA}$ provided by dividing a sum of ionic radii of Li and M by a sum of ionic radii of X is more than 0.261 and less than 0.306;
a value of a difference $\Delta_x$ between average electronegativity of M and average electronegativity of X is not less than 1.7.

The present disclosure provides a solid electrolyte material having high ionic conductivity.

DETAILED DESCRIPTION OF THE EMBODIMENTS

Hereinafter, the embodiments of the present disclosure will be described with reference to the drawings.

First Embodiment

The solid electrolyte material according to the first embodiment is composed of Li, M, and X;
where
M is at least one kind of element selected from the group consisting of metalloid elements and metallic elements other than Li; and
X is at least one kind of element selected from the group consisting of F, Cl, Br and I,
the following mathematical formula (I) is satisfied;

$$FWHM/2\theta_p \leq 0.015 \quad (I)$$

where
FWHM represents a half bandwidth of an X-ray diffraction peak having the highest intensity within a range of a diffraction angle 2θ of not less than 25 degrees and not more than 35 degrees in an X-ray diffraction pattern provided by an X-ray diffraction measurement of the solid electrolyte material; the X-ray diffraction measurement using a Cu-Kα ray; and
$2\theta_p$ represents a diffraction angle of a center of the X-ray diffraction peak;
a value $r_{CA}$ provided by dividing a sum of ionic radii of Li and M by a sum of ionic radii of X is more than 0.261 and less than 0.306;
a value of a difference $\Delta_x$ between average electronegativity of M and average electronegativity of X is not less than 1.7.

The solid electrolyte material according to the first embodiment has high ionic conductivity.

The solid electrolyte material according to the first embodiment is used to provide a battery excellent in a charge-discharge property (for example, an all-solid-state secondary battery).

Since the solid electrolyte material according to the first embodiment does not include sulfur. Even if the solid electrolyte material according to the first embodiment is exposed to an air, hydrogen sulfide is not generated. Therefore, the solid electrolyte material according to the first embodiment is excellent in safety.

The solid electrolyte material according to the first embodiment is an ionic crystal consisting of cations of lithium and M and an anion of X. Therefore, in the bonding between M and X, an ion binding property may be high. Ionic conductivity may be decreased due to an increase in a covalent characteristic or due to an increase in an interaction between lithium and X. In the solid electrolyte material according to the first embodiment, since the difference $\Delta_X$ between average electronegativity of M and electronegativity of X is not less than 1.7, the ion binding property is high. Therefore, in the solid electrolyte material according to the first embodiment, the decrease in the ionic conductivity due to the increase in the covalent characteristic, which has been described above, is prevented.

In the present disclosure, the term "metalloid elements" means B, Si, Ge, As, Sb and Te. The term "metallic element" means all elements included in Group 1-12 elements (except for hydrogen) and all elements included in Group 13-16 elements (except for B, Si, Ge, As, Sb, Te, C, N, P, O, S and Se).

The term "electronegativity" used in the present disclosure is a value described in A. L. Allred, "Electronegativity values from thermochemical data", Journal of Inorganic and Nuclear Chemistry, 17, 215(1961).

The term "ionic radius" used in the present disclosure is a value based on a definition described in Shannon et al., "Revised effective ionic radii and systematic studies of interatomic distances in halides and chalcogenides", Acta A32 (1976) 751.

The solid electrolyte material according to the first embodiment may consist essentially of Li, M, and X. "The solid electrolyte material according to the first embodiment may consist essentially of Li, M, and X" means that a molar ratio (namely, a molar fraction) of the sum of the mole number of Li, M, and X to the sum of the mole number of all the elements constituting of the solid electrolyte material is not less than 90% in the solid electrolyte material according to the first embodiment. As one example, the molar ratio (namely, the molar fraction) may be not less than 95%. The solid electrolyte material according to the first embodiment may consist only of Li, M, and X.

In order to further raise the ionic conductivity, in the solid electrolyte material according to the first embodiment, $0.266 \leq r_{CA} \leq 0.298$ may be satisfied.

A battery including such a solid electrolyte material has a good battery property.

In order to further raise the ionic conductivity, M may include at least one kind of element selected from the group consisting of Group 1 elements, Group 2 elements, Group 3 elements, Group 4 elements, and lanthanoid elements.

An example of Group 1 elements is Na, K, Rb, or Cs. An example of Group 2 elements is Mg, Ca, Sr, or Ba. An example of Group 3 elements is Sc or Y. An example of Group 4 elements is Zr or Hf. An example of the lanthanoid elements is La, Ce, Pr, Nd, Sm, Eu, Gd, Tb, Dy, Ho, Er, Tm, Yb or Lu.

In order to further raise the ionic conductivity, M may include at least one kind of element selected from the group consisting of Na, K, Mg, Ca, Sr, Ba, Sc, Y, Zr, Hf, La, Ce, Pr, Nd, Sm, Eu, Gd, Tb, Dy, Ho, Er, Tm, Yb, and Lu.

In order to further raise the ionic conductivity, M may include at least one kind of element selected from the group consisting of Mg, Ca, Sr, Y, Sm, Gd, Dy, and Hf.

In order to further raise the ionic conductivity, the element X may include at feast one kind of element selected from the group consisting of Br and Cl.

In order to further raise the ionic conductivity, the element X may include Br and Cl.

The shape of the solid electrolyte material according to the first embodiment is not limited. An example of the shape is needle-shaped, spherical, oval-spherical, or fibrous. For example, the solid electrolyte material according to the first embodiment may have a shape of a particle. The solid electrolyte material according to the first embodiment may be formed so as to have a shape of a pellet or a plate.

In order to further raise the ionic conductivity and form a good dispersion state together with another material such as an active material, as one example, if the solid electrolyte material according to the first embodiment has a shape of a particle (e.g., a shape of a sphere), the solid electrolyte material according to the first embodiment may have a median diameter of not less than 0.1 micrometer and not more than 100 micrometers. The median diameter may be not less than 0.5 micrometers and not more than 10 micrometers. The median diameter means a particle size in a case where an accumulation volume in particle size distribution of the volume standard is equal to 50%. The particle size distribution of the volume standard may be measured with a laser diffraction-type measurement device or an image analysis device.

In order to form the good dispersion state of the solid electrolyte material with the active material, if the solid electrolyte material according to the first embodiment has a shape of a particle (e.g., a shape of a sphere), the solid electrolyte material has a smaller median diameter than the active material.

Next, a method for fabricating the solid electrolyte material according to the first embodiment will be described.

The solid electrolyte material according to the first embodiment is fabricated, for example, by the following method.

Starting material powders are prepared so as to have a targeted composition ratio. The starting material powders may be, for example, halides. For example, LiBr, LiCl, and $YCl_3$ are prepared at a $LiBr:LiCl:YCl_3$ molar ratio of 2.0:1.0:1.0 to fabricate $Li_3YBr_2Cl_4$. The starting material powder may be mixed at a molar ratio adjusted in advance so as to cancel the composition change which may occur in a synthesis process.

The kinds of the starting material powders are not limited to the above. For example, a combination of LiCl and $YBr_3$ as well as a complex anion compound such as $LiBr_{0.5}Cl_{0.5}$ may be used. A mixture of a starting material powder including oxygen (e.g., an oxide, a hydroxide, a sulfate, or a nitrate) and a halide (e.g., an ammonium halide) may be used.

The starting material powders are mixed well with a mortar and a pestle or with a ball mill or a mixer to provide a powder mixture. Subsequently, the powder mixture is sintered in vacuum or in an inert atmosphere. The sintering may be performed, for example, within a range of not less than 100 degrees Celsius and not more than 650 degrees Celsius for not less than one hour.

In this way, the solid electrolyte material according to the first embodiment is provided.

Second Embodiment

Hereinafter, the second embodiment of the present disclosure will be described. The matters which have been set forth in the first embodiment will be omitted appropriately.

The battery according to the second embodiment comprises a cathode, an anode, and an electrolyte layer.

The electrolyte layer is disposed between the cathode and the anode.

At least one selected from the group consisting of the cathode, the electrolyte layer, and the anode includes the solid electrolyte material according to the first embodiment.

Since the battery according to the second embodiment includes the solid electrolyte material according to the first embodiment, the charge-discharge property of the battery according to the second embodiment is improved.

Hereinafter, a specific example of the battery according to the second embodiment will be described.

Figure 1:
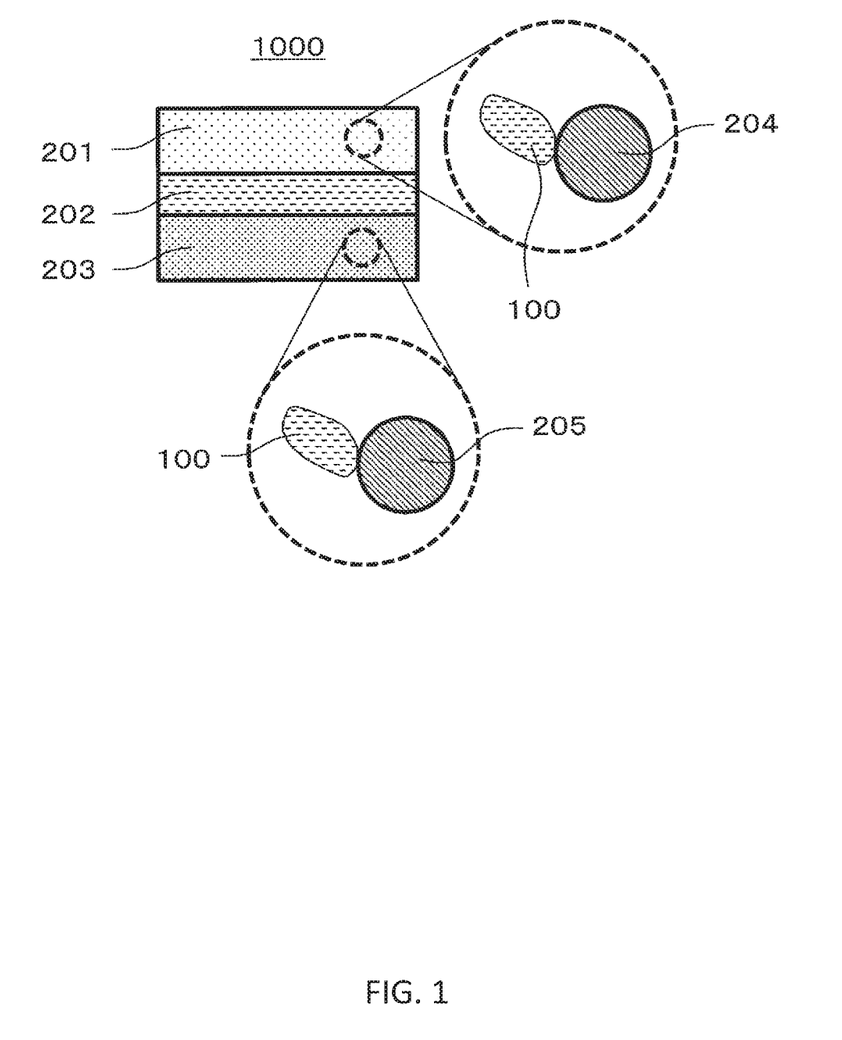
FIG. 1 shows a cross-sectional view of a battery 1000 according to the second embodiment.

FIG. 1 shows a cross-sectional view of a battery 1000 according to the second embodiment.

The battery 1000 according to the second embodiment comprises a cathode 201, an electrolyte layer 202, and an anode 203.

The cathode 201 includes cathode active material particles 204 and solid electrolyte particles 100.

The electrolyte layer 202 is disposed between the cathode 201 and the anode 203.

The electrolyte layer 202 includes an electrolyte material (e.g., a solid electrolyte material).

The anode 203 includes anode active material particles 205 and the solid electrolyte particles 100.

The solid electrolyte particles 100 are particles consisting of the solid electrolyte material according to the first embodiment or particles including the solid electrolyte material according to the first embodiment as a main component. Here, the particles including the solid electrolyte material according to the first embodiment as a main component mean particles in which the most abundant component therein is the solid electrolyte material according to the first embodiment.

(Cathode 201)

The cathode 201 includes a material capable of occluding and releasing metal ions (for example, lithium ions). The cathode 201 includes, for example, a cathode active material (for example, the cathode active material particles 204).

An example of the cathode active material is a lithium-containing transition metal oxide, a transition metal fluoride, a polyanion material, a fluorinated polyanion material, a transition metal sulfide, a transition metal oxyfluoride, a transition metal oxysulfide, or a transition metal oxynitride. An example of the lithium-containing transition metal oxide is $Li(NiCoMn)O_2$, $Li(NiCoAl)O_2$, or $LiCoO_2$.

The cathode active material particles 204 may have a median diameter of not less than 0.1 μm and not more than 100 μm. If the cathode active material particles 204 have a median diameter of not less than 0.1 μm, the cathode active material particles 204 and the solid electrolyte particles 100 are allowed to be dispersed well in the cathode. This improves the charge-discharge property of the battery. If the cathode active material particles 204 have a median diameter of not more than 100 μm, the lithium diffusion speed in the cathode active material particles 204 is improved. This allows the battery to operate at high output.

The cathode active material particles 204 may have a larger median diameter than the solid electrolyte particles 100. This allows the cathode active material particles 204 and the solid electrolyte particles 100 to be dispersed well.

In the cathode 201, a ratio of a volume Vca1 of the cathode active material particles 204 to the sum of the volume Vca1 of the cathode active material particles 204 and a volume Vca1 of the solid electrolyte particles 100 may be not less than 0.30 and not more than 0.95, from the viewpoints of the energy density and the output of the battery. In other words, the ratio of ((Vca1)/(Vca1+Vce1)) may be not less than 0.30 and not more than 0.95.

The cathode 201 may have a thickness of not less than 10 micrometers and not more than 500 micrometers from the viewpoints of the energy density and the output of the battery.

(Electrolyte Layer 202)

The electrolyte layer 202 includes an electrolyte material. The electrolyte material is, for example, a solid electrolyte material. In other words, the electrolyte layer 202 may be a solid electrolyte layer. The solid electrolyte material included in the electrolyte layer 202 may include the solid electrolyte material according to the first embodiment.

In order to improve the charge-discharge property of the battery, the electrolyte layer 202 may include the solid electrolyte material according to the first embodiment as a main component. As one example, in the electrolyte layer 202, a mass ratio of the solid electrolyte material according to the first embodiment to the whole of the electrolyte layer 202 may be not less than 50%.

In order to improve the charge-discharge property of the battery, the mass ratio may be not less than 70%.

The electrolyte layer 202 may include not only the solid electrolyte material according to the first embodiment but also unavoidable impurities. The electrolyte layer 202 may include a starting material of the solid electrolyte material as an unreacted material. The electrolyte layer 202 may include by-products generated during synthesis of the solid electrolyte material. The electrolyte layer 202 may include a decomposition product generated due to the decomposition of the solid electrolyte material.

In order to improve the charge-discharge property of the battery, the mass ratio may be 100% (except for the unavoidable impurities). In other words, the electrolyte layer 202 may be composed only of the solid electrolyte material according to the first embodiment.

The electrolyte layer 202 may be composed only of a solid electrolyte material different from the solid electrolyte material according to the first embodiment. An example of the solid electrolyte material different from the solid electrolyte material according to the first embodiment is $Li_2MgX_4$, $Li_2FeX_4$, $Li(Al,Ga,In)X_4$, $Li_3(Al,Ga,In)X_6$, or $LiI$ (where X is at least one selected from the group consisting of F, Cl, Br, and I).

The electrolyte layer 202 may simultaneously include the solid electrolyte material according to the first embodiment and the solid electrolyte material different from the solid electrolyte material according to the first embodiment. At this time, both may be dispersed uniformly. A layer consisting of the solid electrolyte material according to the first embodiment and a layer consisting of the solid electrolyte material different from the solid electrolyte material according to the first embodiment may be arranged in order along a stacking direction of the battery.

The electrolyte layer 202 may have a thickness of not less than 1 μm and not more than 100 μm. If the electrolyte layer 202 has a thickness of not less than 1 μm, a short circuit between the cathode 201 and the anode 203 is less likely to occur. If the electrolyte layer 202 has a thickness of not more than 100 μm, the battery is allowed to operate at high output.

(Anode 203)

The anode 203 includes a material capable of occluding and releasing metal ions (e.g., lithium ions). The anode 203 includes, for example, an anode active material (for example, anode active material particles 205).

An example of the anode active material is a metal material, a carbon material, an oxide, a nitride, a tin compound, or a silicon compound. The metal material may be a simple metal. Alternatively, the metal material may be an alloy. An example of the metal material is a lithium metal or an alloy thereof. An example of the carbon material is natural graphite, coke, graphitized carbon, carbon fibers, spherical carbon, artificial graphite, or amorphous carbon. From the viewpoint of capacity density, a preferable example of the anode active material is silicon (i.e., Si), tin (i.e., Sn), a silicon compound, or a tin compounds.

The anode active material particles 205 have a median diameter of not less than 0.1 μm and not more than 100 μm. If the anode active material particles 205 have a median diameter of not less than 0.1 μm, the anode active material particles 205 and the solid electrolyte particles 100 are allowed to be dispersed well in the anode 203. This improves the charge-discharge property of the battery. If the anode active material particles 205 have a median diameter of not more than 100 μm, the lithium diffusion speed in the anode active material particles 205 is increased. This allows the battery to operate at high output.

The anode active material particles 205 may have a larger median diameter than the solid electrolyte particles 100. This allows the anode active material particles 205 and the solid electrolyte particles 100 to be dispersed well.

In the anode 203, a ratio of a volume vaa1 of the anode active material particles 205 to the sum of the volume vaa1 of the anode active material particles 205 and a volume vae1 of the solid electrolyte particles 100 may be not less than 0.30 and not more than 0.95, from the viewpoints of the energy density and the output of the battery. In other words, the ratio of (vaa1)/(vaa1+vae1) may be not less than 0.30 and not more than 0.95.

The anode 203 may have a thickness of not less than 10 micrometers and not more than 500 micrometers from the viewpoints of the energy and the output of the battery.

At least one selected from the group consisting of the cathode 201, the electrolyte layer 202, and the anode 203 may include a solid electrolyte material different from the solid electrolyte material according to the first embodiment to raise the ionic conductivity, chemical stability, and electrochemical stability. An example of the solid electrolyte material different from the solid electrolyte material according to the first embodiment is a sulfide solid electrolyte material, an oxide solid electrolyte material, a halide solid electrolyte material, or an organic polymer solid electrolyte.

An example of the sulfide solid electrolyte is $Li_2S—P_2S_5$, $Li_2S—SiS_2$, $Li_2S—B_2S_3$, $Li_2S—GeS_2$, $Li_{3.25}Ge_{0.25}P_{0.75}S_4$, or $Li_{10}GeP_2S_{12}$.

An example of the oxide solid electrolyte is:

(i) a NASICON solid electrolyte such as $LiTi_2(PO_4)_3$ or an element substitution product thereof;

(ii) a $(LaLi)TiO_3$-type perovskite solid electrolyte;

(iii) a LISICON solid electrolyte such as $Li_{14}ZnGe_4O_{16}$, $Li_4SiO_4$, $LiGeO_4$, or an element substitution product thereof;

(iv) a garnet solid electrolyte such as $Li_7La_3Zr_2O_{12}$ or an element substitution product thereof; or (v) $Li_3PO_4$ or an N-substitute thereof.

The halide solid electrolyte may be, for example, a compound represented by the chemical formula $Li_a Me_b Y_c X_6$ (where, a+mb+3c=6 and c>0 are satisfied, Me is at least one selected from the group consisting of the metalloid elements and the metallic elements other than Li and Y, and the value of m is the valence of Me). Me may be at least one selected from the group consisting of Mg, Ca, Sr, Ba, Zn, Sc, Al, Ga, Bi, Zr, Hf, Ti, Sn, Ta, and Nb.

An example of the organic polymer solid electrolyte is a compound of a polymer compound and a lithium salt. The polymer compound may have an ethylene oxide structure. Since the polymer compound having the ethylene oxide structure is capable of including a large amount of lithium salts, the ionic conductivity is further raised.

An example of the lithium salt is $LiPF_6$, $LiBF_4$, $LiSbF_6$, $LiAsF_6$, $LiSO_3CF_3$, $LiN(SO_2CF_3)_2$, $LiN(SO_2C_2F_5)_2$, $LiN(SO_2CF_3)(SO_2C_4F_9)$, or $LiC(SO_2CF_3)_3$. One kind of the lithium salt selected from the above may be used alone. Alternatively, a mixture of two or more kinds of the lithium salts selected from the above may be used.

The at least one selected from the group consisting of the cathode 201, the electrolyte layer 202, and the anode 203 may include a non-aqueous electrolyte liquid, a gel electrolyte, or an ion liquid to facilitate migration of lithium ions and to improve the output property of the battery.

The non-aqueous electrolyte liquid includes a non-aqueous solvent and a lithium salt dissolved in the non-aqueous solvent.

An example of the non-aqueous solvent is a cyclic carbonate ester solvent, a chain carbonate ester solvent, a cyclic ether solvent, a chain ether solvent, a cyclic ester solvent, a chain ester solvent, or a fluorine solvent.

An example of the cyclic carbonate ester solvent is ethylene carbonate, propylene carbonate, or butylene carbonate.

An example of the chain carbonate ester solvent is dimethyl carbonate, ethyl methyl carbonate, or diethyl carbonate.

An example of the cyclic ether solvent is tetrahydrofuran, 1,4-dioxane, or 1,3-dioxolane.

An example of the chain ether solvent is 1 ethoxyethane or 1,2-diethoxyethane.

An example of the cyclic ester solvent is γ-butyrolactone.

An example of the chain ester solvent is methyl acetate.

An example of the fluorine solvent is fluoroethylene carbonate, methyl fluoropropionate, fluorobenzene, fluoroethylmethyl carbonate, or fluorodimethylene carbonate.

One kind of the non-aqueous solvent selected from the group consisting of these solvents may be used alone. Alternatively, as a non-aqueous solvent, a mixture of two or more kinds of the non-aqueous solvents selected from the group consisting of these solvents may be used.

An example of the lithium salt is $LiPF_6$, $LiBF_4$, $LiSbF_6$, $LiAsF_6$, $LiSO_3CF_3$, $LiN(SO_2CF_3)_2$, $LiN(SO_2C_2F_5)_2$, $LiN(SO_2CF_3)(SO_2C_4F_9)$, or $LiC(SO_2CF_3)_3$.

One kind of the lithium salt selected from these lithium salts may be used alone. Alternatively, a mixture of two or more kinds of the lithium salts selected from these lithium salts may be used.

The lithium salt may have a concentration of not less than 0.5 mol/liter and not more than 2 mol/liter.

An example of the gel electrolyte is a polymer material impregnated with the non-aqueous electrolyte liquid. An example of the polymer material is polyethylene oxide, polyacrylonitrile, polyvinylidene fluoride, or polymethyl methacrylate. Another example of the polymer material is a polymer having an ethylene oxide bond.

An example of the cation included in the ion liquid is:

(i) an aliphatic chain quaternary salt such as tetraalkylammonium or tetraalkylphosphonium, (ii) an aliphatic cyclic ammonium such as pyrrolidinium, morpholinium, imidazolinium, tetrahydropyrimidinium, piperazinium, or piperidinium, or (iii) a nitrogen-containing heterocyclic aromatic cation such as pyridinium or imidazolium.

An example of the anion included in the ion liquid is $PF_6^-$, $BF_4^-$, $SbF_6^-$, $AsF_6^-$, $SO_3CF_3^-$, $N(SO_2CF_3)_2^-$, $N(SO_2C_2F_5)_2^-$, $N(SO_2CF_3)(SO_2C_4F_9)^-$, or $C(SO_2CF_3)_3^-$.

The ion liquid may include a lithium salt.

The at least one selected from the group consisting of the cathode 201, the electrolyte layer 202, and the anode 203 may include a binder to improve an adhesion of the particles.

An example of the binder is polyvinylidene fluoride, polytetrafluoroethylene, polyethylene, polypropylene, aramid resin, polyamide, polyimide, polyamide imide, polyacrylonitrile, polyacrylic acid, polyacrylic acid methyl ester, polyacrylic acid ethyl ester, poly acrylic acid hexyl ester, polymethacrylic acid, polymethacrylic acid methyl ester, polymethacrylic acid ethyl ester, polymethacrylic acid hexyl ester, polyvinyl acetate, polyvinyl pyrrolidone, polyether, polyether sulfone, hexafluoropolypropylene, styrene butadiene rubber, or carboxymethylcellulose.

Copolymers may also be used as the binder. An example of such a binder is a copolymer of two or more kinds of materials selected from the group consisting of tetrafluoroethylene, hexafluoroethylene, hexafluoropropylene, perfluoroalkylvinylether, vinylidene fluoride, chlorotrifluoroethylene, ethylene, propylene, pentafluoropropylene, fluoromethylvinylether, acrylic acid, and hexadiene.

A mixture of two or more materials selected from these materials may be used as the binder.

At east one selected from the group consisting of the cathode 201 and the anode 203 may contain a conductive assistant agent to improve electron conductivity.

An example of the conductive assistant agent is:
(i) graphite such natural graphite or artificial graphite;
(ii) carbon black such as acetylene black or ketjen black;
(iii) conductive fibers such as carbon fibers or metal fibers;
(iv) carbon fluoride;
(v) metal powder such as aluminum powder;
(vi) conductive whiskers such as zinc oxide whiskers or potassium titanate whiskers;
(vii) a conductive metal oxide such as titanium oxide; or
(viii) a conductive polymer compound such as polyaniline, polypyrrole, or polythiophene.

The above (i) or (ii) carbon conductive assistant agent is used from the viewpoint of low cost.

With regard to the shape of the battery according to the second embodiment, the battery may be a coin battery, a cylindrical battery, a prismatic battery, a sheet battery, a button battery (i.e., a button cell), a flat-shaped battery, or a laminar battery.

EXAMPLES

The detail of the present disclosure will be described with reference to the following examples and comparative examples.

First, a fabrication method and an evaluation method of solid electrolyte materials according to the inventive examples 1-18 and the comparative examples 1-6 will be described.

[Fabrication of Solid Electrolyte Material]

Inventive Example 1

In an argon atmosphere having a dew point of not more than minus 60 degrees Celsius, LiBr, $YCl_3$, and $YBr_3$ were prepared as starting material powders at a $LiBr:YCl_3:YBr_3$ molar ratio of 2.63:1.44:0.13. Hereinafter, the above argon atmosphere is referred to as "a dry argon atmosphere". These were ground in a mortar to provide a mixture. Subsequently, the provided mixture of the starting material powders was sintered in the dry argon atmosphere with an electric furnace at 500 degrees Celsius for three hours to provide a sintered product. The sintered product was ground with a pestle in the mortar. Thus, the powder of the solid electrolyte material according to the inventive example 1 was provided.

Inventive Examples 2-18

The kinds and molar ratio of the starting material powders used in the inventive examples 2-18 are shown in Table 1.

The solid electrolyte materials according to the inventive examples 2-18 were provided similarly to the case of the inventive example 1 except for the kinds and molar ratio of the starting material powders.

Comparative Examples 1-6

The kinds and molar ratio of the starting material powders used in the comparative examples 1-6 are shown in Table 1.

The solid electrolyte materials according to the comparative examples 1-6 were provided similarly to the case of the inventive example 1 except for the kinds and molar ratio of the starting material powders.

[Evaluation of Crystal Structure and Crystallinity]

Each of the powders of the solid electrolyte materials according to the inventive examples 1-18 and the comparative examples 1-6 was subjected to an X-ray diffraction measurement in an environment where a dry atmosphere having a dew point of not more than minus 40 degrees Celsius was maintained to provide an X-ray diffraction pattern. To analyze crystal structures, an X-ray diffraction device (product of Rigaku corporation, trade name: MiniFlex600) was used. A Cu-Kα ray was used as an X-ray source. As a result of evaluation using an X-ray diffraction method (i.e., XRD), an X-ray diffraction pattern which belongs to a monoclinic crystal as a main crystal phase was observed.

Figure 4:
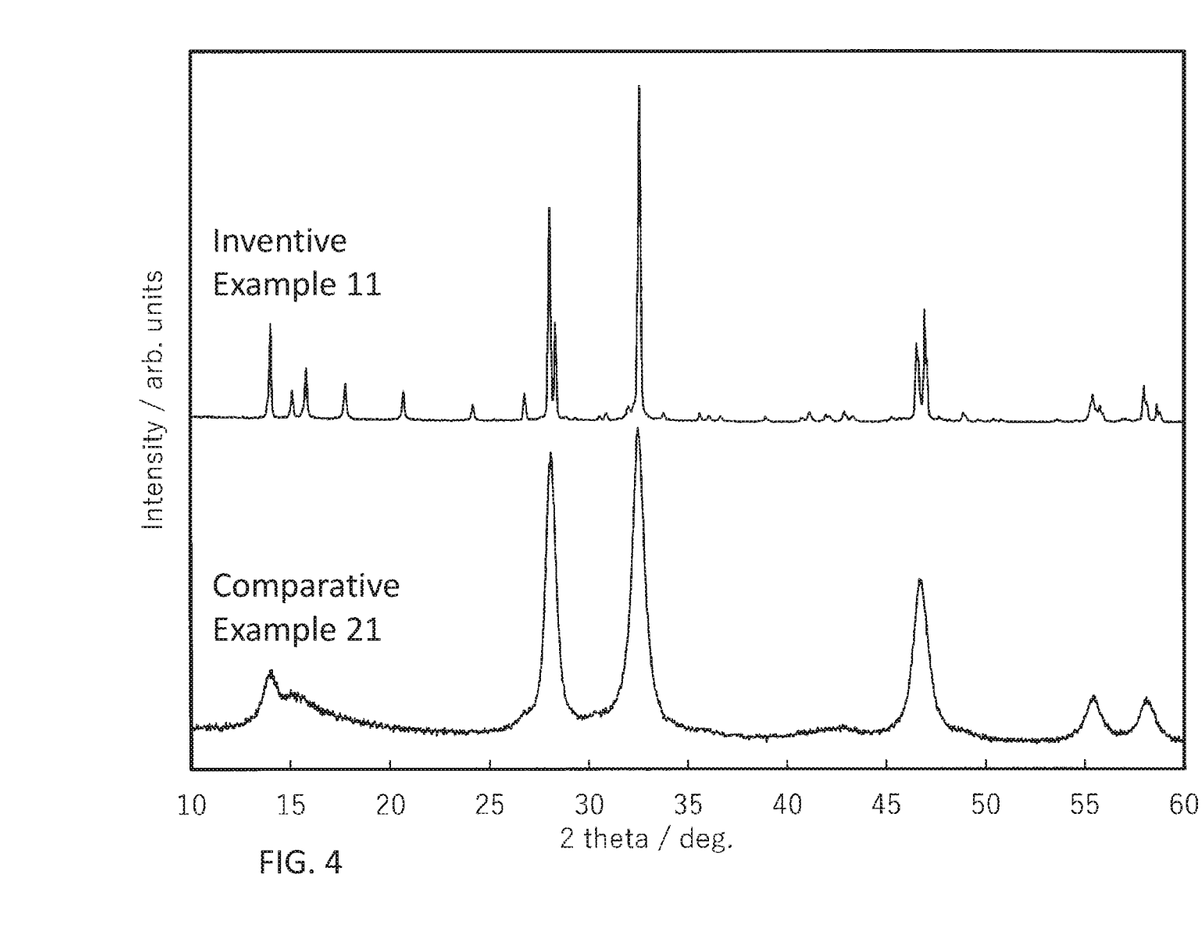
FIG. 4 is a graph showing an X-ray diffraction pattern of the solid electrolyte materials according to the inventive example 11 and the comparative example 21.

As a representative example, the X-ray diffraction pattern of the inventive example 11 will be mentioned. FIG. 4 is a graph showing the X-ray diffraction pattern of the solid electrolyte material according to the inventive example 11.

In the inventive examples 1-18 and the comparative examples 1-6, $FWHM/2\theta_p \leq 0.015$ is satisfied, where FWHM represents a half bandwidth of an X-ray diffraction peak having the highest intensity within a range of a diffraction angle 2θ of not less than 25 degrees and not more than 35 degrees in each of the X-ray diffraction patterns of the solid electrolyte materials according to the inventive examples 1-18 and the comparative examples 1-6, and $2\theta_p$ represents a diffraction angle of a center of the corresponding X-ray diffraction peak.

The term "monoclinic crystal" used in the present disclosure means a crystal phase which has a crystal structure similar to that of $Li_3ErBr_6$ disclosed in Inorganic Crystal Structure Database (hereinafter, referred to as "ICS©") #01-087-0159, and has an X-ray diffraction pattern specific to this crystal structure. Therefore, the presence of the monoclinic crystal included in the solid electrolyte material is determined on the basis of the X-ray diffraction pattern. At this time, the diffraction angle and/or the peak intensity ratio of the diffraction pattern may be changed from that/those of Li₃ErBr₆, depending on the kinds of the elements included in the solid electrolyte material.

[$r_{CA}$]

With regard to each of the solid electrolyte materials according to the inventive examples 1-18 and the comparative examples 1-6, the value $r_{CA}$ provided by dividing the sum of ion radii of Li and M by the sum of ionic radii of X was calculated. The sum of the ionic radii of Li and M included in the solid electrolyte material was calculated on the basis of the following formula:

$$\Sigma(r_C \cdot R_C)$$

where $r_C$ represents the ionic radius of the element (namely, the cation) included in Li and M; and $R_C$ represents the mole number in the solid electrolyte material of the elements included in Li and M.

The sum of the ionic radii of X included in the solid electrolyte material was calculated on the basis of the following formula:

$$\Sigma(r_A \cdot R_A)$$

where $r_A$ represents the ionic radius of the element (namely, anions) included in X; and $R_A$ represents the mole number in the solid electrolyte material of the element included in X.

The values of $r_{CA}$ were calculated on the basis of the following formula using the calculated values of the sums of the ionic radii.

$$r_{CA} = \Sigma(r_C \cdot R_C)/\Sigma(r_A \cdot R_A)$$

The value of $r_{CA}$ of the solid electrolyte material according to the inventive example 1 was calculated as below.

The solid electrolyte material according to the inventive example 1 includes Li and Y as the cations. The solid electrolyte material according to the inventive example 1 includes Cl and Br as the anions. The ionic radii of Li, Y, Cl and Br are 0.76, 0.90, 1.81 and 1.96, respectively. The mole numbers of Li, Y, Cl, and Br are 2.625, 1.125, 3.000, and 3.000, respectively. Therefore, the value of $r_{CA}$ was calculated to be 0.266, by calculating (0.76×2.625+0.90×1.125)/(1.81×3.000+1.96×3.000).

The values of $r_{CA}$ are shown in Table 1.

[$\Delta_X$]

With regard to each of the solid electrolyte materials according to the inventive examples 1-18 and the comparative examples 1-6, the difference $\Delta_X$ between average electronegativity of M and average electronegativity of X was calculated on the basis of the following formula:

$$\Delta_X = \Sigma(X_A \cdot R_A)/\Sigma R_A - \Sigma(X_M \cdot R_M)/\Sigma R_M$$

where $X_A$ represents the electronegativity of the element included in X;

$R_A$ represents the mole number in the solid electrolyte material of the element included in X;

$X_M$ represents the electronegativity of the element included in M; and $R_M$ represents the mole number in the solid electrolyte material of the element included in M.

The value of $\Delta_X$ of the solid electrolyte material according to the inventive example 1 was calculated as below.

The solid electrolyte material according to the inventive example 1 includes Li and Y as the cations. The solid electrolyte material according to the inventive example 1 includes Cl and Br as the anions. The electronegativity of Li, Y, Cl and Br are 0.98, 1.22, 3.16, and 2.96, respectively. The mole numbers of Li, Y, Cl, and Br are 2.625, 1.125, 3.000, and 3.000, respectively. Therefore, the value of $\Delta_X$ was calculated to be 1.84, by calculating (3.16×3.000+2.96×3,000)/(3.000+3.000)−(1.22×1.125)/(1.125).

The values of $\Delta_X$ are shown in Table 1.

[Measurement of Ionic Conductivity]

Figure 2:
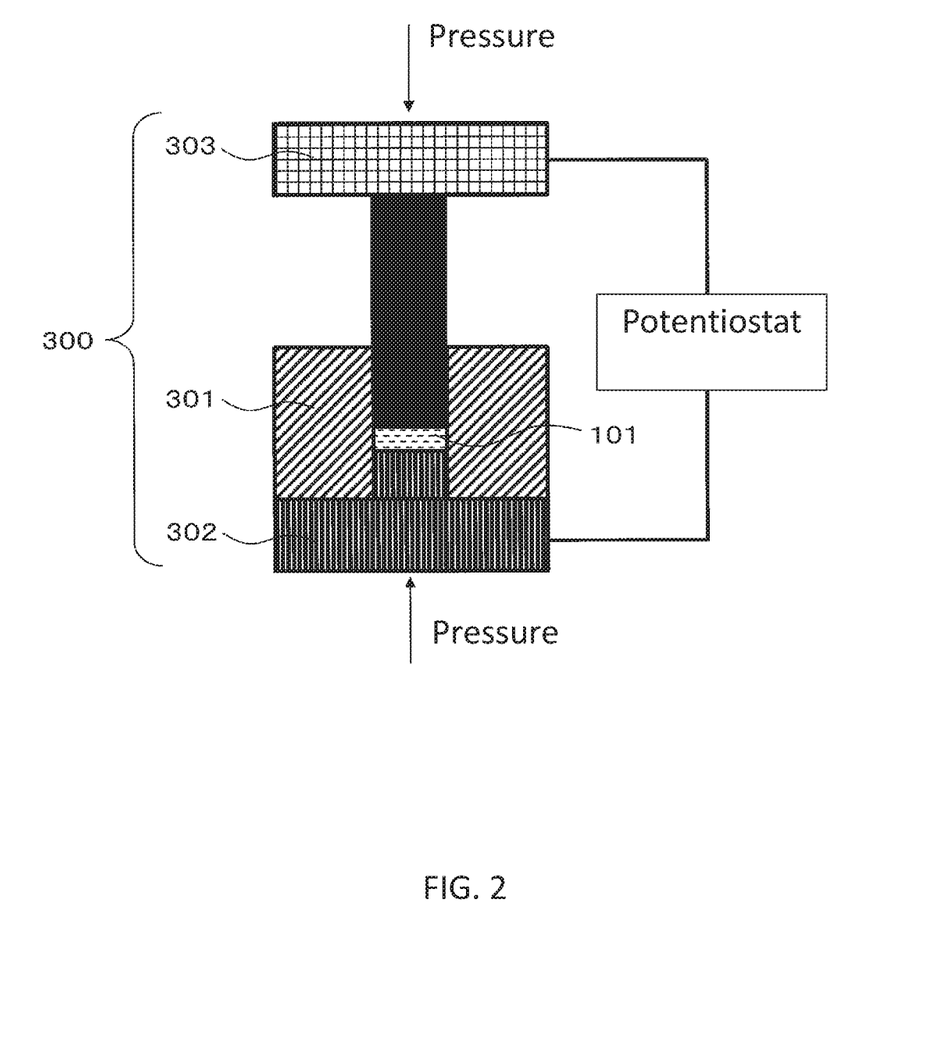
FIG. 2 shows a schematic view of a press forming die 300 which is used to evaluate ionic conductivity of a solid electrolyte material.

FIG. 2 shows a schematic view of a press forming die 300 which was used to evaluate the ionic conductivity of the solid electrolyte material.

The press forming die 300 comprised a casing 301, a punch lower part 302, and a punch upper part 303. The casing 301 was formed of insulating polycarbonate. Both of the punch upper part 303 and the punch lower part 302 were formed of electronically conductive stainless steel.

The ionic conductivity was measured by the following method using the press forming die 300 shown in FIG. 2.

In a dry atmosphere having a dew point of not more than minus 30 degrees Celsius, the inside of the press forming die 300 was filled with the powder 101 of the solid electrolyte material according to the inventive example 1. A pressure of 400 MPa was applied to the solid electrolyte material according to the inventive example 1 using the punch lower part 302 and the punch upper part 303 in the press forming die 300.

While the pressure was applied, the impedance of the solid electrolyte material according to the inventive example 1 was measured through the punch lower part 302 and the punch upper part 303 by an electrochemical impedance measurement method at room temperature using a potentiostat with a frequency response analyzer. The potentiostat was a product of Princeton Applied Research company, trade name: VersaSTAT4.

An actual number of the impedance at the measurement point where an absolute value of a phase of complex impedance was smallest was counted as the resistance value with regard to the ionic conductivity of the solid electrolyte material.

The ionic conductivity was calculated on the basis of the following formula (II) using the resistance value of the solid electrolyte material:

$$\sigma = (R_{SE} \times S/t)^{-1} \quad \text{(II)}$$

where

σ is an ionic conductivity,

S is a contact area of the solid electrolyte material with the punch upper part 303, which is equal to the cross-sectional area of the hollow part of the casing 301 in FIG. 2, $R_{SE}$ is a resistance value of the solid electrolyte material in the impedance measurement; and t is a thickness of the solid electrolyte material to which the pressure has been applied, which is equal to the thickness of a layer formed of the solid electrolyte particles 100 in FIG. 2.

In the inventive examples 2-18 and the comparative examples 1-6, the ionic conductivity was measured similarly to the above.

The ionic conductivity of each of the solid electrolyte materials according to the inventive examples 1-18 and the comparative examples 1-6 is shown in Table 1.

[Fabrication of Secondary Battery]

A secondary battery was fabricated using the solid electrolyte material according to the inventive example 11.

In the dry argon atmosphere, the solid electrolyte material according to the inventive example 11 and Li(Ni, Co, Mn)O₂ were prepared at a volume ratio of 50:50. These prepared materials were mixed in an agate mortar to provide a cathode mixture. Li(Ni, Co, Mn)O$_2$ served as a cathode active material.

In an insulative tube having an inner diameter of 9.5 millimeters, a sulfide solid electrolyte Li$_6$PS$_5$Cl (60 mg), the solid electrolyte material according to the inventive example 11 (20 mg, equal to the thickness of 700 micrometers), and the cathode mixture (9.6 mg) were stacked in sequence to provide a stacking structure. A pressure of 720 MPa was applied to the stacking structure to form the first electrode and the solid electrolyte layer.

Then; a metal InLi was stacked on the solid electrolyte layer. A pressure of 80 MPa was applied to this stacking structure to form the second electrode. The second electrode after the application of the pressure had a thickness of 600 micrometers. In this way, a stacking structure of the first electrode, the solid electrolyte layer, and the second electrode was fabricated. The first electrode was a cathode, and the second electrode was an anode.

Current collectors each formed of stainless steel were attached to the first electrode and the second electrode, and then, current collector leads were attached to the current collectors. Finally, the inside of the insulative tube was shielded with an insulating ferrule from an outer atmosphere to seal the inside of the insulative tube.

In this way, a secondary battery according to the inventive example 11 was provided.

[Charge-Discharge Test]

Figure 3:
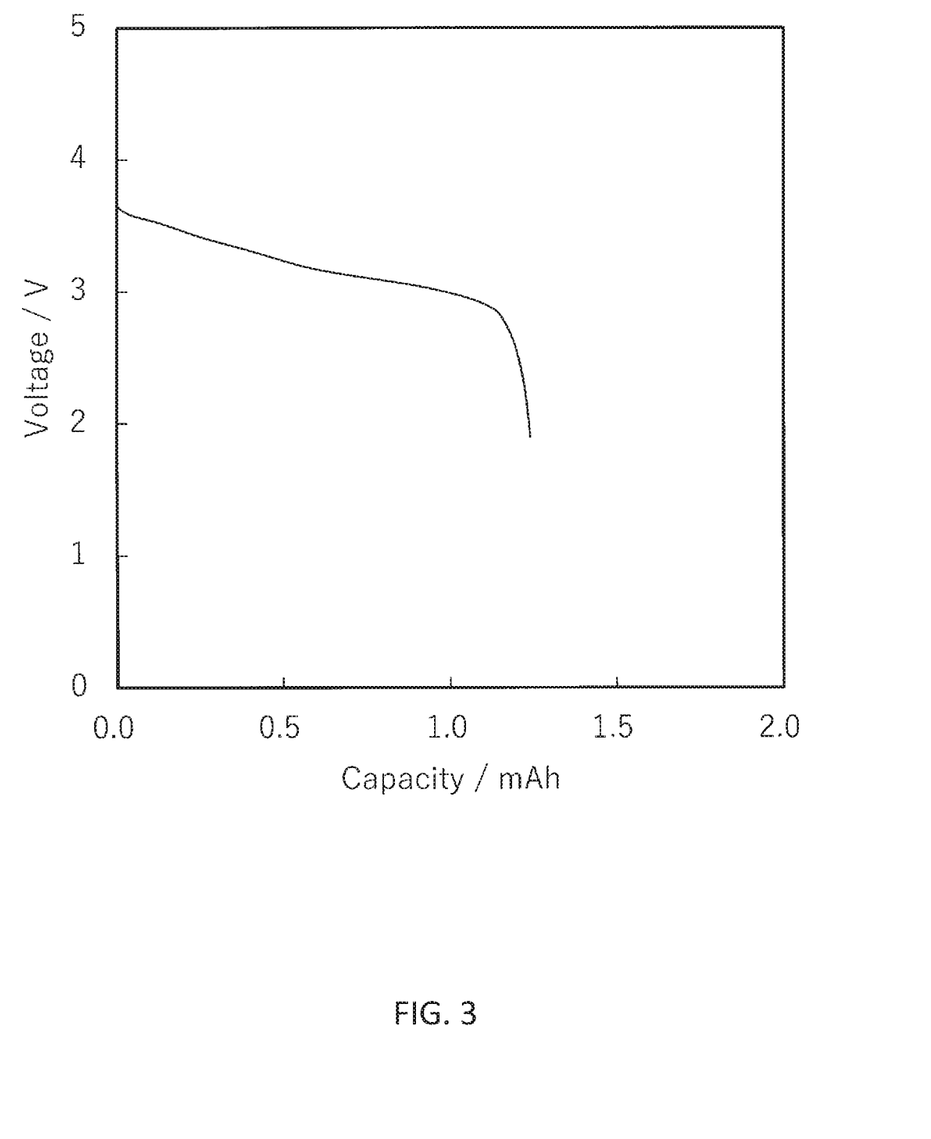
FIG. 3 is a graph showing an initial discharge property of the battery according to the inventive example 11.

FIG. 3 is a graph showing an initial discharge property of the secondary battery according to the inventive example 11.

The initial discharge property shown in FIG. 3 was measured by the following method.

The battery according to the inventive example 11 was placed in a thermostat at 25 degrees Celsius. The battery was charged at a current density of 0.1 mA/cm$^2$ until the voltage reached 3.7 volts. Subsequently, the battery was discharged at a current density of 0.1 mA/cm$^2$ until the voltage reached 1.9 volts. The current density corresponds to a 0.05 C rate.

As a result of the charge-discharge test, the secondary battery according to the inventive example 11 had an initial discharge capacity of 1.2 mAh.

Each of the batteries fabricated using the solid electrolyte materials according to the inventive examples 1-10 and 12-18 exhibited a good battery property, similarly to the battery according to the inventive example 11.

TABLE 1

| | Constituent element | $r_{CA}$ | $\Delta_X$ | Ionic conductivity (S cm$^{-1}$) | Molar ratio | | | |
|---|---|---|---|---|---|---|---|---|
| | | | | | LiCl | LiBr | YCl$_3$ | YBr$_3$ |
| C.E. 1 | Li, Y, Br | 0.253 | 1.74 | 7.0 × 10$^{-4}$ | — | 2.55 | — | 1.15 |
| C.E. 2 | Li, Y, Cl, Br | 0.261 | 1.82 | 9.3 × 10$^{-4}$ | 2.55 | — | — | 1.15 |
| I.E. 1 | Li, Y, Cl, Br | 0.266 | 1.84 | 1.5 × 10$^{-3}$ | — | 2.63 | 1.00 | 0.13 |
| I.E. 2 | Li, Y, Cl, Br | 0.268 | 1.84 | 1.6 × 10$^{-3}$ | — | 2.67 | 1.00 | 0.11 |
| I.E. 3 | Li, Y, Cl, Br | 0.268 | 1.83 | 1.6 × 10$^{-3}$ | — | 2.70 | 1.10 | — |
| I.E. 4 | Li, Y, Br | 0.270 | 1.74 | 1.5 × 10$^{-3}$ | | 3.00 | — | 1.00 |
| I.E. 5 | Li, Y, Cl, Br | 0.272 | 1.84 | 1.8 × 10$^{-3}$ | — | 2.79 | 1.00 | 0.07 |
| I.E. 6 | Li, Y, Cl, Br | 0.275 | 1.84 | 1.9 × 10$^{-3}$ | — | 2.85 | 1.05 | — |
| I.E. 7 | Li, Y, Cl, Br | 0.275 | 1.84 | 2.0 × 10$^{-3}$ | — | 2.85 | 1.00 | 0.05 |
| I.E. 8 | Li, Y, Cl, Br | 0.277 | 1.84 | 2.0 × 10$^{-3}$ | — | 2.90 | 1.00 | 0.03 |
| I.E. 9 | Li, Y, Cl, Br | 0.277 | 1.81 | 2.0 × 10$^{-3}$ | — | 3.00 | 0.33 | 0.67 |
| I.E. 10 | Li, Y, Cl, Br | 0.279 | 1.84 | 2.2 × 10$^{-3}$ | — | 2.95 | 1.00 | 0.02 |
| I.E. 11 | Li, Y, Cl, Br | 0.281 | 1.84 | 2.0 × 10$^{-3}$ | — | 3.00 | 1.00 | — |
| I.E. 12 | Li, Y, Cl, Br | 0.285 | 1.87 | 1.9 × 10$^{-3}$ | 1.00 | 2.00 | 1.00 | — |
| I.E. 13 | Li, Y, Cl, Br | 0.287 | 1.84 | 2.0 × 10$^{-3}$ | 0.15 | 3.15 | 0.95 | — |
| I.E. 14 | Li, Y, Cl, Br | 0.287 | 1.84 | 1.6 × 10$^{-3}$ | 0.15 | 3.00 | 0.95 | — |
| I.E. 15 | Li, Y, Cl, Br | 0.292 | 1.83 | 1.6 × 10$^{-3}$ | — | 3.30 | 0.90 | — |
| I.E. 16 | Li, Y, Cl, Br | 0.293 | 1.84 | 1.6 × 10$^{-3}$ | 0.30 | 3.00 | 0.90 | — |
| I.E. 17 | Li, Y, Cl, Br | 0.296 | 1.84 | 1.5 × 10$^{-3}$ | 0.38 | 3.00 | 0.88 | — |
| I.E. 18 | Li, Y, Cl, Br | 0.298 | 1.84 | 1.4 × 10$^{-3}$ | 0.42 | 3.00 | 0.86 | — |
| C.E. 3 | Li, Y, Cl, Br | 0.306 | 1.84 | 7.8 × 10$^{-4}$ | 0.60 | 3.00 | 0.80 | — |
| C.E. 4 | Li, Y, Cl, Br | 0.309 | 1.82 | 8.0 × 10$^{-4}$ | — | 3.75 | 0.75 | — |
| C.E. 5 | Li, Y, Cl, Br | 0.314 | 1.81 | 7.4 × 10$^{-4}$ | — | 3.90 | 0.70 | — |
| C.E. 6 | Li, Y, Cl, Br | 0.319 | 1.81 | 5.5 × 10$^{-4}$ | — | 4.05 | 0.65 | — |

C.E. means Comparative Example
I.E. means Inventive Example

Next, a fabrication method and an evaluation method of the solid electrolyte materials according to the comparative examples 7-32 will be described.

[Fabrication of Solid Electrolyte Material]

Comparative Example 7

In the dry argon atmosphere, LiBr, YCl$_3$, and YBr$_3$ were prepared as starting material powders at a LiBr:YCl$_3$:YBr$_3$ molar ratio of 1.5:0.33:1.17. Then, the mixture of the starting material powders was subjected to milling treatment with a planetary ball mill at 100 rpm for one hour. Subsequently, likewise, with the planetary ball, the mixture of the starting material powders was further subjected to milling treatment at 600 rpm for 12 hours. In this way, a powder of the solid electrolyte material according to the comparative example 7 was provided.

Comparative Examples 8-32

The kinds and molar ratio of the starting material powders used in the comparative examples 8-32 are shown in Table 2.

The solid electrolyte materials according to the comparative examples 8-32 were provided similarly to the case of the comparative example 7 except for the kinds and molar ratio of the starting material powders.

[Evaluation of Crystal Structure and Crystallinity]

Similarly to the case of the inventive example 1, the crystal structure and the crystallinity of each of the solid electrolyte materials according to the comparative examples 7-32 were evaluated. As a result, an X-ray diffraction pattern having a broad shape was observed in each of the solid electrolyte materials of the comparative examples 7-32, as compared to the X-ray diffraction pattern of the solid electrolyte material according to the inventive example 11. This was an X-ray diffraction pattern similar to that of the solid electrolyte material described in Patent Literature 3. From the above, the present inventors believe that each of the solid electrolyte materials according to the comparative examples 7-32 includes a crystal phase which belongs to monoclinic crystal. As a representative example, the X-ray diffraction pattern of the solid electrolyte material according to the comparative example 21 is shown in FIG. 4.

In each of the solid electrolyte materials according to the comparative examples 7-32, FWHM/$2\theta_p$≤0.015 is not satisfied. This result reveals that each of the crystal phases included in the solid electrolyte materials according to the comparative examples 7-32 has lower crystallinity than each of the crystal phases included in the solid electrolyte materials according to the inventive examples 1-18.

[$r_{CA}$]

The values of $r_{CA}$ of the solid electrolyte materials according to the comparative examples 7-32 were calculated similarly to the case of the inventive example 1. The values of $r_{CA}$ of the solid electrolyte materials according to the comparative examples 7-32 are shown in Table 2.

[$\Delta_X$]

The values of $\Delta_X$ of the solid electrolyte materials according to the comparative examples 7-32 were calculated similarly to the case of the inventive example 1. The values of $\Delta_X$ of the solid electrolyte materials according to the comparative examples 7-32 are shown in Table 2.

[Measurement of Ionic Conductivity]

The ionic conductivity of the solid electrolyte materials according to the comparative examples 7-32 were measured similarly to the case of the inventive example 1. The ionic conductivity of the solid electrolyte materials according to the comparative examples 7-32 are shown in Table 2.

The solid electrolyte materials which include indium and are shown in Table 2 as the comparative examples 33 and 34 were not actually fabricated. As the ionic conductivity, the values disclosed in Non-Patent Literature 1 are cited. The values of $r_{CA}$ and $\Delta_X$ were calculated similarly to the case of the inventive example 1.

TABLE 2

| | Constituent element | $r_{CA}$ | $\Delta_X$ | Ionic conductivity (S cm$^{-1}$) | Molar ratio LiCl | LiBr | YCl$_3$ | YBr$_3$ |
|---|---|---|---|---|---|---|---|---|
| C.E. 7 | Li, Y, Br, Cl | 0.214 | 1.77 | 1.2 × 10$^{-4}$ | — | 1.50 | 0.33 | 1.17 |
| C.E. 8 | Li, Y, Br | 0.223 | 1.74 | 2.1 × 10$^{-4}$ | — | 1.80 | — | 1.40 |
| C.E. 9 | Li, Y, Br, Cl | 0.226 | 1.91 | 1.0 × 10$^{-4}$ | 0.50 | 1.00 | 1.50 | — |
| C.E. 10 | Li, Y, Br, Cl | 0.232 | 1.84 | 3.1 × 10$^{-4}$ | — | 1.80 | 1.00 | 0.40 |
| C.E. 11 | Li, Y, Br | 0.241 | 1.74 | 4.1 × 10$^{-4}$ | — | 2.25 | — | 1.25 |
| C.E. 12 | Li, Y, Br, Cl | 0.242 | 1.94 | 2.0 × 10$^{-4}$ | 1.80 | — | 1.40 | — |
| C.E. 13 | Li, Y, Br | 0.253 | 1.74 | 5.6 × 10$^{-4}$ | — | 2.55 | — | 1.15 |
| C.E. 14 | Li, Y, Cl | 0.261 | 1.94 | 4.6 × 10$^{-4}$ | 2.25 | — | 1.25 | — |
| C.E. 15 | Li, Y, Br | 0.265 | 1.74 | 6.8 × 10$^{-4}$ | — | 2.85 | — | 1.05 |
| C.E. 16 | Li, Y, Br | 0.269 | 1.74 | 6.4 × 10$^{-4}$ | — | 2.97 | — | 1.01 |
| C.E. 17 | Li, Y, Br | 0.270 | 1.74 | 6.1 × 10$^{-4}$ | — | 3.00 | — | 1.00 |
| C.E. 18 | Li, Y, Cl | 0.274 | 1.94 | 6.3 × 10$^{-4}$ | 2.55 | — | 1.15 | — |
| C.E. 19 | Li, Y, Br, Cl | 0.274 | 1.77 | 6.2 × 10$^{-4}$ | — | 3.00 | 0.33 | 0.67 |
| C.E. 20 | Li, Y, Br, Cl | 0.277 | 1.81 | 8.4 × 10$^{-4}$ | — | 3.00 | 0.67 | 0.33 |
| C.E. 21 | Li, Y, Br, Cl | 0.281 | 1.84 | 8.2 × 10$^{-4}$ | — | 3.00 | 1.00 | — |
| C.E. 22 | Li, Y, Br | 0.282 | 1.74 | 6.4 × 10$^{-4}$ | — | 3.30 | — | 0.90 |
| C.E. 23 | Li, Y, Br, Cl | 0.285 | 1.87 | 9.7 × 10$^{-4}$ | 1.00 | 2.00 | 1.00 | — |
| C.E. 24 | Li, Y, Cl | 0.286 | 1.94 | 6.7 × 10$^{-4}$ | 2.90 | — | 1.00 | — |
| C.E. 25 | Li, Y, Cl | 0.286 | 1.94 | 6.9 × 10$^{-4}$ | 2.85 | — | 1.05 | — |
| C.E. 26 | Li, Y, Br, Cl | 0.289 | 1.91 | 9.8 × 10$^{-4}$ | 2.00 | 1.00 | 1.00 | — |
| C.E. 27 | Li, Y, Cl | 0.289 | 1.94 | 4.9 × 10$^{-4}$ | 2.91 | — | 1.03 | — |
| C.E. 28 | Li, Y, Cl | 0.293 | 1.94 | 5.0 × 10$^{-4}$ | 3.00 | — | 1.00 | — |
| C.E. 29 | Li, Y, Br | 0.294 | 1.74 | 3.8 × 10$^{-4}$ | — | 3.60 | — | 0.80 |
| C.E. 30 | Li, Y, Br | 0.300 | 1.74 | 2.2 × 10$^{-4}$ | — | 3.75 | — | 0.75 |
| C.E. 31 | Li, Y, Cl | 0.306 | 1.94 | 3.9 × 10$^{-4}$ | 3.30 | — | 0.90 | — |
| C.E. 32 | Li, Y, Br, Cl | 0.306 | 1.84 | 3.7 × 10$^{-4}$ | 0.60 | 3.00 | 0.80 | — |
| C.E. 33 | Li, In, Br | 0.262 | 1.18 | <1.0 × 10$^{-4}$ | — | — | — | — |
| C.E. 34 | Li, In, Cl, Br | 0.272 | 1.28 | <1.2 × 10$^{-4}$ | — | — | — | — |

(Discussion 1)

Figure 5:
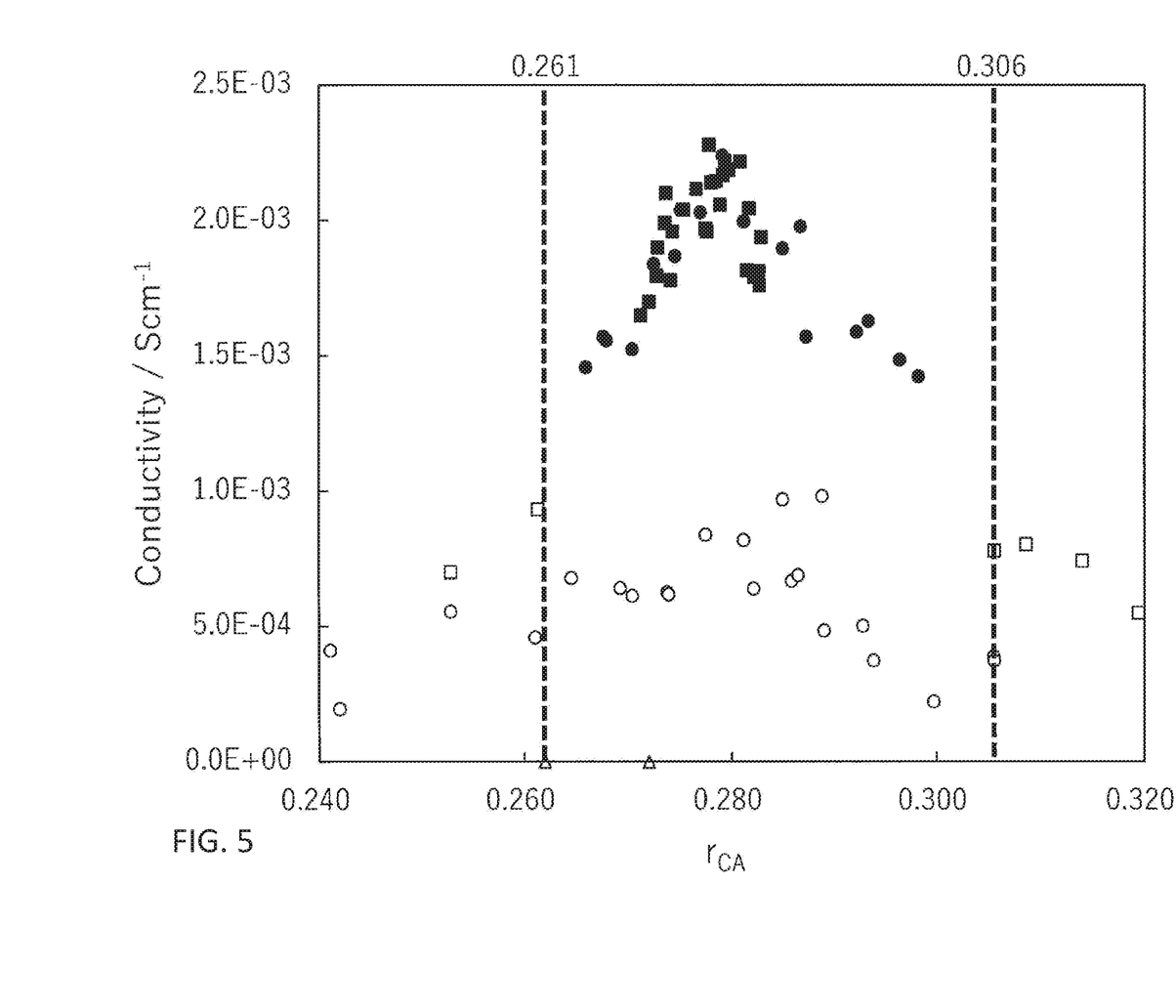
FIG. 5 is a graph showing a relation between the ionic conductivity and the value of $r_{CA}$ in each of the solid electrolyte materials according to the inventive examples 1-47 and the comparative examples 1-34.

FIG. 5 is a graph of a relation of the ionic conductivity and the value $r_{CA}$ of the solid electrolyte materials according to the inventive examples 1-18 and the comparative examples 1-32. The vertical axis of the graph represents the ionic conductivity. The horizontal axis of the graph represents the value of $r_{CA}$. In FIG. 5, the black circles, the black squares, the white squares, the white circles, and the white triangles indicate the plotting results of the inventive examples 1-18, the inventive examples 19-47, the comparative examples 1-6, the comparative examples 7-32, and the comparative examples 33-34, respectively.

In the comparative examples 7-32, FWHM/$2\theta_p$≤0.015 is not satisfied. In the comparative examples 7-32, it is revealed that the ionic conductivity changes gradually with the change of $r_{CA}$. In the inventive examples 1-18 and the comparative examples 1-6, FWHM/$2\theta_p$≤0.015 is satisfied. Also in the inventive examples 1-18 and the comparative examples 1-6, the ionic conductivity changes with the change of $r_{CA}$. It is revealed from the results of the inventive examples 1-18 that, if FWHM $2\theta_p$≤0.015 is satisfied, the ionic conductivity is raised significantly within a range of $0.261<r_{CA}<0.306$. Generally, a material having high crystallinity has relatively higher ionic conductivity than a material having low crystallinity. It is revealed that the effect of the improvement of the ionic conductivity due to the improvement of the crystallinity is significantly high within the range of $0.261<r_{CA}<0.306$ in the solid electrolyte material according to the present disclosure.

The solid electrolyte materials according to the comparative examples 33 and 34 include indium, which corresponds to M, and relatively high crystallinity. In addition, in the solid electrolyte materials according to the comparative examples 33 and 34, $0.261<r_{CA}<0.306$ is satisfied. However, the solid electrolyte materials according to the comparative examples 33 and 34 have lower ionic conductivity than the solid electrolyte materials according to the inventive examples 1-18, Since indium has relatively high electronegativity, the difference $\Delta_X$ between electronegativity of indium, which corresponds to M, and electronegativity of the halogen element, which corresponds to X, is small. As a result, the covalent characteristic therebetween becomes high. In other words, a covalent bond is formed between M and X. If the electronegativity of M is high, the effect that the halogen element draws negative electric charge is weakened. This causes lithium to be drawn to the halogen element, so that the lithium ionic conductivity would be lowered. Therefore, the value of $\Delta_X$ is required to be not less than 1.7.

Hereinafter, a fabrication method and an evaluation method of the solid electrolyte materials according to the inventive examples 19-26 will be described.

inventive example 19 except for the kinds and molar ratio of the starting material powders.

[Evaluation of Crystal Structure and Crystallinity]

Similarly to the case of the inventive example 1, the crystal structure and the crystallinity of each of the solid electrolyte materials according to the inventive examples 19-26 were evaluated. As a result, an X-ray diffraction pattern similar to that of the inventive example 11 was observed in each of the solid electrolyte materials of the inventive examples 19-26. Therefore, the present inventors believe that each of the solid electrolyte materials according to the inventive examples 19-26 has a crystal phase which belongs to the monoclinic crystal. In each of the solid electrolyte materials according to the inventive examples 19-26, $FWHM/2\theta_p \leq 0.015$ is satisfied.

[$r_{CA}$]

The values of $r_{CA}$ of the solid electrolyte materials according to the inventive examples 19-26 were calculated similarly to the case of the inventive example 1. The values of $r_{CA}$ of the solid electrolyte materials according to the inventive examples 19-26 are shown in Table 3.

[$\Delta_X$]

The values of $\Delta_X$ of the solid electrolyte materials according to the inventive examples 19-26 were calculated similarly to the case of the inventive example 1. The values of $\Delta_X$ of the solid electrolyte materials according to the inventive examples 19-26 are shown in Table 3.

[Measurement of Ionic Conductivity]

The ionic conductivity of the solid electrolyte materials according to the inventive examples 19-26 were measured similarly to the case of the inventive example 1. The ionic conductivity of the solid electrolyte materials according to the inventive examples 19-26 are shown in Table 3.

TABLE 3

| | constituent element | $r_{CA}$ | $\Delta_X$ | Ionic conductivity (S cm$^{-1}$) | Molar ratio | | | | |
|---|---|---|---|---|---|---|---|---|---|
| | | | | | LiBr | MgBr$_2$ | CaBr$_2$ | SrBr$_2$ | YCl$_3$ |
| I.E. 19 | Li, Mg, Y, Cl, Br | 0.278 | 1.84 | $2.0 \times 10^{-3}$ | 2.90 | 0.05 | — | — | 1.00 |
| I.E. 20 | Li, Mg, Y, Cl, Br | 0.274 | 1.83 | $1.8 \times 10^{-3}$ | 2.80 | 0.10 | — | — | 1.00 |
| I.E. 21 | Li, Ca, Y, Cl, Br | 0.279 | 1.85 | $2.1 \times 10^{-3}$ | 2.90 | — | 0.05 | — | 1.00 |
| I.E. 22 | Li, Ca, Y, Cl, Br | 0.277 | 1.86 | $2.1 \times 10^{-3}$ | 2.80 | — | 0.10 | — | 1.00 |
| I.E. 23 | Li, Ca, Y, Cl, Br | 0.274 | 1.87 | $2.0 \times 10^{-3}$ | 2.70 | — | 0.15 | — | 1.00 |
| I.E. 24 | Li, Sr, Y, Cl, Br | 0.280 | 1.85 | $2.0 \times 10^{-3}$ | 2.90 | — | — | 0.05 | 1.00 |
| I.E. 25 | Li, Sr, Y, Cl, Br | 0.278 | 1.86 | $2.0 \times 10^{-3}$ | 2.80 | — | — | 0.10 | 1.00 |
| I.E. 26 | Li, Sr, Y, Cl, Br | 0.277 | 1.88 | $2.0 \times 10^{-3}$ | 2.70 | — | — | 0.15 | 1.00 |

[Fabrication of Solid Electrolyte Material]

Inventive Example 19

In the dry argon atmosphere, LiBr, MgBr$_2$, and YCl$_3$ were prepared as starting material powders at a LiBr:MgBr$_2$:YCl$_3$ molar ratio of 2.9:0.05:1.0, The starting material powders were ground and mixed in a mortar to provide a mixture. Subsequently, the mixture was sintered in the dry argon atmosphere with an electric furnace at 500 degrees Celsius for three hours to provide a sintered product. The sintered product was ground in the mortar. Thus, the powder of the solid electrolyte material according to the inventive example 19 was provided.

Inventive Examples 20-26

The kinds and molar ratio of the starting material powders used in the inventive examples 20-26 are shown in Table 3.

The solid electrolyte materials according to the inventive examples 20-26 were provided similarly to the case of the Hereinafter, a fabrication method and an evaluation method of solid electrolyte materials according to the inventive examples 27-47 will be described.

[Fabrication of Solid Electrolyte Material]

Inventive Example 27

In the dry argon atmosphere, LiBr, YCl$_3$, YBr$_3$, and SmCl$_3$ were prepared as starting material powders at a LiBr:YCl$_3$:YBr$_3$:SmCl$_3$ molar ratio of 2.9:6.93:0.02:0.05. The starting material powders were ground and mixed in a mortar to provide a mixture. Subsequently, the mixture was sintered in the dry argon atmosphere with an electric furnace at 500 degrees Celsius for three hours to provide a sintered product. The sintered product was ground in the mortar. Thus, the powder of the solid electrolyte material according to the inventive example 27 was provided.

Inventive Examples 28-47

The kinds and molar ratio of the starting material powders used in the inventive examples 28-47 are shown in Table 4.

The solid electrolyte materials according to the inventive examples 28-47 were provided similarly to the case of the inventive example 27 except for the kinds and molar ratio of the starting material powders.

[Evaluation of Crystal Structure and Crystallinity]

Similarly to the case of the inventive example 1, the crystal structure and the crystallinity of each of the solid electrolyte materials according to the inventive examples 27-47 were evaluated. As a result, an X-ray diffraction pattern similar to that of the inventive example 11 was observed in each of the solid electrolyte materials of the inventive examples 27-47. Therefore, the present inventors believe that each of the solid electrolyte materials according to the inventive examples 27-47 has a crystal phase which belongs to the monoclinic crystal. In each of the solid electrolyte materials according to the inventive examples 27-47, $FWHM/2\theta_p \leq 0.015$ is satisfied. From the results, it was revealed that the crystal phase included in each of the solid electrolyte materials according to the inventive examples 27-47 has higher crystallinity than the crystal phase included in each of the solid electrolyte materials according to the comparative examples 1-34.

$[r_{CA}]$

The values of $r_{CA}$ of the solid electrolyte materials according to the inventive examples 27-47 were calculated similarly to the case of the inventive example 1. The values of $r_{CA}$ of the solid electrolyte materials according to the inventive examples 27-47 are shown in Table 4.

$[\Delta_X]$

The values of $\Delta_X$ of the solid electrolyte materials according to the inventive examples 27-47 were calculated similarly to the case of the inventive example 1. The values of $\Delta_X$ of the solid electrolyte materials according to the inventive examples 27-47 are shown in Table 4.

[Measurement of Ionic Conductivity]

The ionic conductivity of the solid electrolyte materials according to the inventive examples 27-47 were measured similarly to the case of the inventive example 1. The ionic conductivity of the solid electrolyte materials according to the inventive examples 27-47 are shown in Table 4.

TABLE 4

|  | Constituent element | $r_{CA}$ | $\Delta_X$ | Ionic conductivity (S cm$^{-1}$) | Molar ratio | | | | | | | |
|---|---|---|---|---|---|---|---|---|---|---|---|---|
|  |  |  |  |  | LiBr | YCl$_3$ | YBr$_3$ | SmCl$_3$ | GdCl$_3$ | GdBr$_3$ | DyCl$_3$ | HfCl$_4$ |
| I.E. 27 | Li, Y, Sm, Cl, Br | 0.279 | 1.84 | 2.2 × 10$^{-3}$ | 2.90 | 0.93 | 0.02 | 0.05 | — | — | — | — |
| I.E. 28 | Li, Y, Sm, Cl, Br | 0.275 | 1.84 | 2.0 × 10$^{-3}$ | 2.85 | 0.95 | 0.05 | 0.05 | — | — | — | — |
| I.E. 29 | Li, Y, Sm, Cl, Br | 0.277 | 1.84 | 2.0 × 10$^{-3}$ | 2.80 | 0.87 | 0.03 | 0.10 | — | — | — | — |
| I.E. 30 | Li, Y, Sm, Cl, Br | 0.274 | 1.85 | 2.0 × 10$^{-3}$ | 2.60 | 0.73 | 0.07 | 0.20 | — | — | — | — |
| I.E. 31 | Li, Y, Sm, Cl, Br | 0.282 | 1.89 | 2.0 × 10$^{-3}$ | 3.00 | 0.90 | — | 0.10 | — | — | — | — |
| I.E. 32 | Li, Y, Sm, Cl, Br | 0.283 | 1.85 | 1.8 × 10$^{-3}$ | 3.00 | 0.70 | — | 0.30 | — | — | — | — |
| I.E. 33 | Li, Y, Sm, Cl, Br | 0.278 | 1.86 | 2.1 × 10$^{-3}$ | 3.00 | 0.57 | 0.33 | 0.10 | — | — | — | — |
| I.E. 34 | Li, Gd, Br | 0.274 | 1.76 | 2.1 × 10$^{-3}$ | 3.00 | — | — | — | — | 1.00 | — | — |
| I.E. 35 | Li, Y, Gd, Br | 0.273 | 1.76 | 1.9 × 10$^{-3}$ | 3.00 | — | 0.25 | — | — | 0.75 | — | — |
| I.E. 36 | Li, Y, Gd, Br | 0.272 | 1.75 | 1.7 × 10$^{-3}$ | 3.00 | — | 0.50 | — | — | 0.50 | — | — |
| I.E. 37 | Li, Y, Gd, Br | 0.271 | 1.75 | 1.7 × 10$^{-3}$ | 3.00 | — | 0.75 | — | — | 0.25 | — | — |
| I.E. 38 | Li, Y, Gd, Cl, Br | 0.278 | 1.81 | 2.3 × 10$^{-3}$ | 3.00 | 0.57 | 0.33 | — | 0.10 | — | — | — |
| I.E. 39 | Li, Y, Gd, Cl, Br | 0.278 | 1.81 | 2.1 × 10$^{-3}$ | 3.00 | 0.37 | 0.33 | — | 0.30 | — | — | — |
| I.E. 40 | Li, Y, Gd, Cl, Br | 0.279 | 1.82 | 2.2 × 10$^{-3}$ | 3.00 | 0.17 | 0.33 | — | 0.50 | — | — | — |
| I.E. 41 | Li, Y, Gd, Cl, Br | 0.280 | 1.82 | 2.2 × 10$^{-3}$ | 3.00 | — | 0.33 | — | 0.67 | — | — | — |
| I.E. 42 | Li, Gd, Cl, Br | 0.281 | 1.83 | 2.2 × 10$^{-3}$ | 3.00 | — | — | — | 0.67 | 0.33 | — | — |
| I.E. 43 | Li, Y, Gd, Cl, Br | 0.282 | 1.84 | 1.8 × 10$^{-3}$ | 3.00 | 0.90 | — | — | 0.10 | — | — | — |
| I.E. 44 | Li, Y, Gd, Cl, Br | 0.282 | 1.85 | 1.8 × 10$^{-3}$ | 3.00 | 0.70 | — | — | 0.30 | — | — | — |
| I.E. 45 | Li, Y, Gd, Cl, Br | 0.283 | 1.85 | 1.9 × 10$^{-3}$ | 3.00 | 0.50 | — | — | 0.50 | — | — | — |
| I.E. 46 | Li, Y, Dy, Cl, Br | 0.283 | 1.84 | 1.8 × 10$^{-3}$ | 3.00 | 0.90 | — | — | — | — | 0.10 | — |
| I.E. 47 | Li, Y, Hf, Cl, Br | 0.273 | 1.83 | 1.8 × 10$^{-3}$ | 2.90 | 0.87 | 0.03 | — | — | — | — | 0.10 |

(Discussion 2)

The ionic conductivity and the values of $r_{CA}$ of the solid electrolyte materials according to the inventive examples 19-47 were plotted on FIG. 5. From the result, it is revealed that the ionic conductivity of the each of the solid electrolyte materials according to the inventive examples 19-47 is also significantly high within the range of $0.261 < r_{CA} < 0.306$, similarly to the cases of the inventive examples 1-18. Therefore, M included in the solid electrolyte material according to the present disclosure is not limited to Y (i.e., yttrium). It is revealed that a similar tendency is exhibited, if the element M includes Group 2 elements, Group 3 elements, Group 4 elements or lanthanoid elements. Since homologous elements exhibit similar chemical properties, a solid electrolyte material including other Group 1-4 elements which are not shown in the inventive examples would also have high lithium ionic conductivity. With regard to X, since chemical properties are similar in Group 17 elements, X is allowed to be easily substituted with another Group 17 element. If the element X includes at least one selected from the group consisting of F, Cl, Br and I, the solid electrolyte material according to the present disclosure would have high lithium ionic conductivity.

INDUSTRIAL APPLICABILITY

The solid electrolyte material according to the present disclosure can be used, for example, as an all solid-state lithium ion secondary battery.

REFERENTIAL SIGNS LIST

100 Solid electrolyte particle
101 Powder of solid electrolyte material
201 Cathode
202 Electrolyte layer
203 Anode
204 Cathode active material particle
205 Anode active material particle
300 Press forming die
301 Casing
302 Punch lower part
303 Punch upper part
1000 Battery

The invention claimed is:

1. A solid electrolyte material, wherein:
the solid electrolyte material is composed of Li, M, and X, where:
M is at least one kind of element selected from the group consisting of metalloid elements and metallic elements, wherein the metalloid elements include B, Si, Ge, As, Sb and Te, and the metallic elements include Group 1-12 elements except for hydrogen, Li, Tb, Dy, Ho, Er, Tm, Yb, Sc, Lu, and Y, and Group 13-16 elements except for B, Si, Ge, As, Sb, Te, C, N, P, O, S and Se; and
X is at least one kind of element selected from the group consisting of F, Cl, Br and I,
the following mathematical formula (I) is satisfied, $$FWHM/2\theta_p \leq 0.015 \quad (I)$$

where:
FWHM represents a half bandwidth of an X-ray diffraction peak having the highest intensity within a range of a diffraction angle 2θ of not less than 25 degrees and not more than 35 degrees in an X-ray diffraction pattern provided by an X-ray diffraction measurement of the solid electrolyte material; the X-ray diffraction measurement using a Cu-Kα ray, and
$2\theta_p$ represents a diffraction angle of a center of the X-ray diffraction peak,
a value $r_{RC}$ provided by dividing a sum of ionic radii of Li and M by a sum of ionic radii of X is more than 0.261 and less than 0.306, and
a value of a difference $\Delta_X$ between average electronegativity of M and average electronegativity of X is not less than 1.7.

2. The solid electrolyte material according to claim 1, wherein
the value $r_{CA}$ is not less than 0.266 and not more than 0.298.

3. The solid electrolyte material according to claim 1, wherein
M includes at least one kind of element selected from the group consisting of Group 1 elements, Group 2 elements, Group 3 elements, Group 4 elements and lanthanoid elements.

4. The solid electrolyte material according to claim 3, wherein
M includes at least one kind of element selected from the group consisting of Mg, Ca, Sr, Sm, Gd, and Hf.

5. The solid electrolyte material according to claim 1, wherein
X includes at least one kind of element selected from the group consisting of Br and Cl.

6. The solid electrolyte material according to claim 5, wherein
X includes Br and Cl.

7. A battery, comprising:
a cathode;
an anode; and
an electrolyte layer disposed between the cathode and the anode,
wherein
at least one selected from the group consisting of the cathode, the anode, and the electrolyte layer includes the solid electrolyte material according to claim 1.

8. The solid electrolyte material according to claim 1, wherein
X is at least one kind of element selected from the group consisting of F, Br and I.

9. The solid electrolyte material according to claim 1, wherein
X is at least one kind of element selected from the group consisting of F and I.

* * * * *